United States Patent
Moore et al.

(10) Patent No.: US 8,468,340 B2
(45) Date of Patent: *Jun. 18, 2013

(54) CONFIGURING A VALID DURATION PERIOD FOR A DIGITAL CERTIFICATE

(71) Applicant: SecureAuth Corporation, Irvine, CA (US)

(72) Inventors: Stephen Moore, Portland, OR (US); Garret Graiek, Aliso Viejo, CA (US); Mark Lambiase, Ladera Ranch, CA (US); Craig Lund, Lake Forest, CA (US)

(73) Assignee: SecureAuth Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,304

(22) Filed: Oct. 29, 2012

(65) Prior Publication Data

US 2013/0067219 A1 Mar. 14, 2013

Related U.S. Application Data

(63) Continuation of application No. 12/075,219, filed on Mar. 10, 2008, now Pat. No. 8,301,877.

(51) Int. Cl.
*H04L 29/06* (2006.01)

(52) U.S. Cl.
USPC ............................ 713/156; 713/175; 380/277

(58) Field of Classification Search
USPC ....................................................... 713/156
See application file for complete search history.

(56) References Cited

U.S. PATENT DOCUMENTS

| | | | |
|---|---|---|---|
| 4,868,877 | A | 9/1989 | Fischer |
| 5,881,226 | A | 3/1999 | Veneklase |
| 5,999,711 | A | 12/1999 | Misra et al. |
| 6,026,166 | A | 2/2000 | LeBourgeois |
| 6,035,406 | A | 3/2000 | Moussa et al. |
| 6,233,341 | B1 | 5/2001 | Riggins |
| 6,324,645 | B1 | 11/2001 | Andrews et al. |
| 6,336,186 | B1 | 1/2002 | Dyksterhouse et al. |
| 7,120,929 | B2 | 10/2006 | Beattie et al. |
| 7,127,607 | B1 | 10/2006 | Su et al. |
| 7,131,009 | B2 | 10/2006 | Scheidt et al. |

(Continued)

OTHER PUBLICATIONS

Authentication in an Internet Banking Environment; Federal Financial Institutions Examination Council; 2001, 14 Pages.

(Continued)

*Primary Examiner* — Philip Chea
*Assistant Examiner* — Kendall Dolly
(74) *Attorney, Agent, or Firm* — Knobbe Martens Olson & Bear LLP (57) ABSTRACT

A valid duration period for a digital certificate is established by a process that includes assigning numeric values to certificate term. The numeric value assigned to each certificate term is representative of the valid duration period. The method continues by identifying one certificate term, which may include requesting a user to select a certificate term. The method may include transmitting the requested certificate term to a server. The certificate term requested is sent via a certificate request. The server is configured to convert the numeric value associated with the requested certificate term into a duration counter value. The method may also include a certificate server receiving from the server, the certificate request including the duration counter value. The method may conclude with transmitting the signed certificate request to a client device capable of generating the digital certificate with the requested certificate term.

20 Claims, 5 Drawing Sheets

U.S. PATENT DOCUMENTS

| | | |
|---|---|---|
| 7,140,036 B2 | 11/2006 | Bhagavatula et al. |
| 7,143,286 B2 | 11/2006 | Brown et al. |
| 7,185,364 B2 | 2/2007 | Knouse et al. |
| 2001/0032310 A1 | 10/2001 | Corella |
| 2003/0041136 A1 | 2/2003 | Cheline et al. |
| 2004/0268148 A1 | 12/2004 | Karjala |
| 2005/0076205 A1 | 4/2005 | Thornton et al. |
| 2005/0081026 A1 | 4/2005 | Thornton et al. |
| 2005/0102503 A1 | 5/2005 | Imai |
| 2006/0015716 A1 | 1/2006 | Thornton et al. |
| 2006/0294366 A1 | 12/2006 | Nadalin |
| 2007/0174243 A1 | 7/2007 | Fritz |
| 2008/0222412 A1 | 9/2008 | Hu |
| 2008/0320569 A1 | 12/2008 | Parkinson |
| 2009/0025074 A1 | 1/2009 | Le Saint et al. |
| 2009/0113543 A1 | 4/2009 | Adams et al. |
| 2009/0133107 A1 | 5/2009 | Thoursie |
| 2009/0300744 A1 | 12/2009 | Guo et al. |
| 2011/0197070 A1 | 8/2011 | Mizrah |

OTHER PUBLICATIONS

Dierks, T., et al., Network Working Group, The Transport Layer Security (TLS) Protocol Version 1.1, Apr. 2006, 88 pages.

Gutmann, Peter, Everything you Never Wanted to Know about PKI but were Forced to Find Out, University of Aukland, presentation, Aug. 2002, 48 Pages.

Housley, R., et al., Network Working Group, Internet X.509 Public Key Infrastructure Certificate and Certificate Revocation List (CRL) Profile, Apr. 2002, 108 pages.

http://www.entrust.com/pki.htm What is PKI? Dec. 8, 2006, 5 pages.

http://www.articsoft.com/wp_pki_intro.htm Introduction to Public Key Infrastructure, printed Jan. 26, 2007, 6 pages.

Kent, S., Network Working Group, Privacy Enhancement for Internet Electronic Mail: Part II: Certificate-Based Key Management, Feb. 1993, 29 pages.

Marchesini, et al., Keyjacking: The Surprising Insecurity of Client-side SSL, Dartmouth College, Feb. 13, 2004, 16 Pages.

Meyers, M., et al., Network Working Group, X.509 Internet Public Key Infrastructure Online Certificate Status Protocol-OCSP, Jun. 2009, 21 pages.

International Search Report, PCT/US 08/08920, Mailed Jul. 23, 2008.

International Search Report, PCT/US 09/37770, Mar. 20, 2009.

CONFIGURING A VALID DURATION PERIOD FOR A DIGITAL CERTIFICATE

CROSS-REFERENCE TO RELATED APPLICATIONS

This application is a continuation of U.S. patent application Ser. No. 12/075,219 filed on Mar. 10, 2008, soon to issue as U.S. Pat. No. 8,301,877, the entire disclosure of which is hereby incorporated by reference.

BACKGROUND OF THE INVENTION

1. Field of the Invention

The present invention generally relates to a method and system for configuring a valid duration period for a digital certificate. More particularly, the present invention relates to a method and system for automating the advanced configuration of the valid duration period of the digital certificate on a certificate server.

2. Description of the Related Art

Banking, financial services, government, education, and all varieties of companies rely upon advanced computer systems and data communication networks such as the Internet. While such advancements have greatly increased the speed and convenience with which business is conducted, numerous vulnerabilities compromise the security of the highly sensitive and confidential data being exchanged. At the most basic level, electronic transactions typically involve a server computer system and a client computer system communicating over a network. Additional client or server computer systems may also be connected to the network, such that multiple clients may access a given server, or multiple servers may be accessed by a given client. In this open network environment, the primary concern of data security is three-fold. First, the server must be assured that the client is what it asserts it is. Second, the client must be assured that the server is what it asserts it is. Third, any information being exchanged between a legitimate server and a legitimate client must not be intercepted or changed by any other computer systems on the network.

In the electronic banking setting, for example, the bank must authenticate the identity of the user accessing the banking server, so that transactions relating only to a particular customer are permitted, and that the user accessing the banking server is verified as the customer or someone given authority by the customer. The client must be ensured that the banking server is, indeed, the server operated by the bank, and not a similar one operated by a malicious entity. This is known as a phishing attack, where a fake server is made to resemble the legitimate server, and tricks the user into providing confidential information such as bank account numbers, social security numbers, passwords, and the like. Much harm may be inflicted on the customer by a criminal possessing such information, including erroneous accumulation of debt, arrest records, criminal convictions, destruction of creditworthiness, damage to reputation, and so forth. These are also known as identity theft crimes. Because confidential information is being transmitted over an open network, such information must be encrypted or otherwise rendered incomprehensible to any other system besides the client and the server. The open nature of the network renders computer systems susceptible to replay attacks, where a valid data transmission is intercepted and repeated later for fraudulent or malicious purposes. For example, passwords or other authentication information may be intercepted, and used later to gain access to sensitive information. Further, the information being transmitted on the network must not be modifiable, such as in the case of man-in-the-middle attacks. This involves an attacker reading, inserting and modifying data between a legitimate client and server with neither recognizing the compromised nature of the link.

Generally, these security considerations are of primary importance in all networking environments where sensitive and/or confidential data is being exchanged. Without proper safeguards that prevent the above-described attacks, the security of the organization's data as well as the organization's customers' or clients' data may be compromised, leading to even greater losses than that affecting just one individual.

A proven method to authenticate across the Internet in a manner that ensures the validity of the end user is to use public/private key pairs to digitally sign an authentication request. In this scenario an authentication server sends a message to a client with an expectation that the client will validate its identity by signing the message with the user's private key. Most often this message is a digitally hashed message, utilizing some common hashing mechanism such as MD2, MD4, MD5, SHA1 or some other hash algorithm. The client runs the hash and then signs this hash with the user's private key and returns this digitally signed message to the server. The server, utilizing the same hashing algorithm, then digitally hashes the same message and stores this value, for comparison later, this hash value is called the "Current Hash Value." The server then takes the digitally signed signature from the client and decrypts this hash value with the user's public key. The server then compares this decrypted digital signature with the Current Hash-Value, if the two are not identical, the digital signature is invalid and the verification is unsuccessful.

Digital certificates have been employed in the context of digital message signing and authentication on the Internet. This mechanism requires a trusted third party or "certificate authority" (CA) responsible for checking each purported owner's claim to the published public key, i.e., requiring some proof of identification of persons publishing and posting public keys for purposes of encryption on the Internet. The certification authority then adds its digital signature to the public key and this, in effect, validates the public key. Compatibility, therefore, is necessary for wide spread and effective use of such digital certificates. Digital certificates issued by different CA's must be compatible in a context of encryption and decryption on a global communications network, i.e., the Internet. Software used to check and certify public keys must reference some standard protocol to be universally effective. One standard form for digital certificates is commonly referred to as the "X.509" standard. This standard was originally part of a "X.500" series of standards, but has been extended to embrace a wide variety of Internet services such as E-mail, worldwide web protocols, user authentication, and electronic commerce.

The client browser retrieves a digital certificate associated with the web server. The certificate, which contains the public key, is used by the browser to authenticate the identity of the web server or network resource, and to encrypt a session key transmitted back thereto for use in encrypting subsequent data. In order to ensure the legitimacy of the server certificate, it is signed by a CA.

Digital certificates are widely used for https web sites, where a web browser validates that an SSL (Transport Layer Security) web server is authentic. If the web server is authentic, the user knows that the website is exactly who it says it is and not an impostor. This type of security is very important with regard to electronic commerce over the Internet. Typically, the web site operator obtains a certificate by applying to a CA with a certificate signing request. The certificate signing request is an electronic document that may contain the website name, a contact email address, and company information. The CA signs the request producing a public certificate. The public certificate is delivered to the web browser that establishes a connection between the client device and the website. The certificate proves to the web browser that the CA trusted and issued a certificate to the owner of the website.

CA's are guarantors of the authenticity and security of online transactions. To accomplish this, the CA's issue digital certificates, or encrypted electronic packages carrying information that authenticates its sender. Certificates usually are issued for one year, although the duration can vary widely. Most CA's are wary of issuing a certificate for longer periods due to concern of long-term security in light of developing technology, the aversion to risk stemming from the trust of individual holders, and the desire to reap continued income from issuing new certificates. Currently, the duration of digital certificates are determined at the CA. Additionally, if the duration of the digital certificate is to be changed, it requires advanced skills in the cryptography field to configure the CA and the appropriate expiration fields in order to vary the duration period. This is a difficult process that many are unfamiliar with.

Accordingly, there is a need in the art for a method and system for a client device and a server to interact and configure a valid duration period for a digital certificate at the CA.

SUMMARY OF THE INVENTION

In accordance with one embodiment of the present invention, there is provided a method for configuring a valid duration period for a digital certificate. Each digital certificate includes a certificate term, which is a length of time until the digital certificate expires or is no longer valid. The method begins with assigning a positive numeric value for each certificate term from a plurality of certificate terms. An aspect of the invention contemplates a long-term digital certificate and a short-term digital certificate as comprising the plurality of certificate terms. The positive numeric value assigned to each certificate term is representative of the valid duration period. In one embodiment of the present invention, the positive numeric value represents a length of time measured in either days or hours depending upon the certificate term. The method continues by prompting a user of the client device to request one certificate term from the plurality of certificate terms. In this respect, a question may be prompted on the display of the client device. The certificate term requested may depend on the answer provided by the user of the client device. Further, the method may include transmitting the requested certificate term to a server. The certificate term requested is sent to the server via a certificate request. The server is configured to convert the positive numeric value associated with the requested certificate term into a computer understood time unit. An aspect of the present invention contemplates the positive numeric value being converted into a duration counter. The method also contemplates the server being in communication with a certificate server. The method may also include the certificate server receiving from the server, the certificate request including the duration counter. The certificate server is configured to digitally sign the certificate request. The method may conclude with the client device generating the digital certificate having the valid duration period correspond to the positive numeric value associated with the requested certificate term. The digital certificate is generated on the client device in response to receiving the digitally signed certificate request.

In another embodiment of the present invention, the certificate term selected is automated and does not require a user to select the certificate term prompted on the client device. This is accomplished by the client component being processed on the client device. The client component or the client device may include programmable inputs for automating the selection of a particular certificate term. It is also contemplated that the client component is configured to access and external program with programmable inputs for selecting a particular certificate term on the client device without requiring a user to select from a plurality of certificate terms.

According to another embodiment of the present invention there is provided a server component disposed within the server. The server component may be in communication with the client device. The server component may also be configured to be accessible by a server administrator having the authority to access the server component. The server administrator may vary the positive numeric value associated with each certificate term. This may be accomplished by the server administrator entering the positive numeric value in a configuration parameter associated with each certificate term. Another aspect of the present invention contemplates a client component installed on the client device. The client component may be configured to be processed by the client device. In response to being processed by the client device, the client component prompts the user of the client device to select or request the certificate term. The client component may be a software plug-in component transmitted from the server component to the client device. In another embodiment, the client component is installed on the client device independent of the server component. It is also contemplated that the method may include a certificate policy component installed on the certificate server. The certificate policy component is configured to access the duration counter received on the certificate server via the certificate request. The method may also contemplate the certificate policy component being programmed to digitally sign the certificate request with the valid duration period corresponding to the duration counter. In this respect, the certificate policy component accesses the duration counter and then automatically implements advanced cryptographic functions on the certificate server to initiate the signing of the certificate request with the duration counter being converted into the valid duration period for the digital certificate.

Another method for configuring a valid duration period for a digital certificate is provided in accordance with an embodiment of the present invention. The method may begin with establishing a communication link between a client device and a server via a web browser. In this respect, the communication link may be established by a user on the client device entering a web address for the server in the URL of the web browser. Upon establishing the communication link, the web browser may prompt a user of the client device to request a certificate term. In another embodiment it is contemplated that a client component will input information from a third party or internal process to determine if the certificate should be a short or long term certificate. It is also contemplated that the certificate term is selected by processing the client component on the client device. The certificate term is selected based upon automated parameters on the client device. In another embodiment, the client component is configured to access an external program for automatically selecting the certificate term. The method may continue by associating a positive numeric value with the certificate term requested. The positive numeric value is assigned to the requested certificate term on the server. In accordance with an embodiment of the present invention, the server is accessible to a server administrator, wherein the server administrator may assign the positive numeric value for the certificate term requested. The server is also configured to convert the positive numeric value associated with the certificate term requested into a duration counter. The duration counter being a computer understood time unit. The method continues with the server transmitting a certificate request to a certificate server. The certificate request includes the duration counter. The certificate server is configured to digitally sign the certificate request. The method may further continue with the client device receiving the signed certificate request. The client device receives the signed certificate request via the web browser application. In response to receiving the signed certificate request, the client device generates the digital certificate having the valid duration period correspond to the positive numeric value associated with the certificate term requested.

In yet another embodiment of the present invention, there is provided a system for configuring a valid duration period for a digital certificate. The system may include a plurality of certificate terms. Each certificate term includes a positive numeric value assigned to it. The positive numeric value is representative of a quantity of time. The system further comprises a server for storing the plurality of certificate terms. The server may include a server component for converting the positive numeric value associated with each certificate term into a duration counter. The server component may also be configured to generate a certificate request including the duration counter. The system may include a certificate server for receiving the certificate request including the duration counter from the server component. The certificate server is configured to digitally sign the certificate request. The system further comprises a client device for requesting one certificate term from the plurality of certificate terms. The positive numeric value associated with the requested certificate term is representative of the valid duration period for the digital certificate. The client device is configured to generate the digital certificate having the valid duration period corresponding to the positive numeric value for the requested certificate term. The client device generates the digital certificate upon receiving the signed certificate request.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PREFERRED EMBODIMENT

The detailed description set forth below in connection with the appended drawings is intended as a description of the present embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
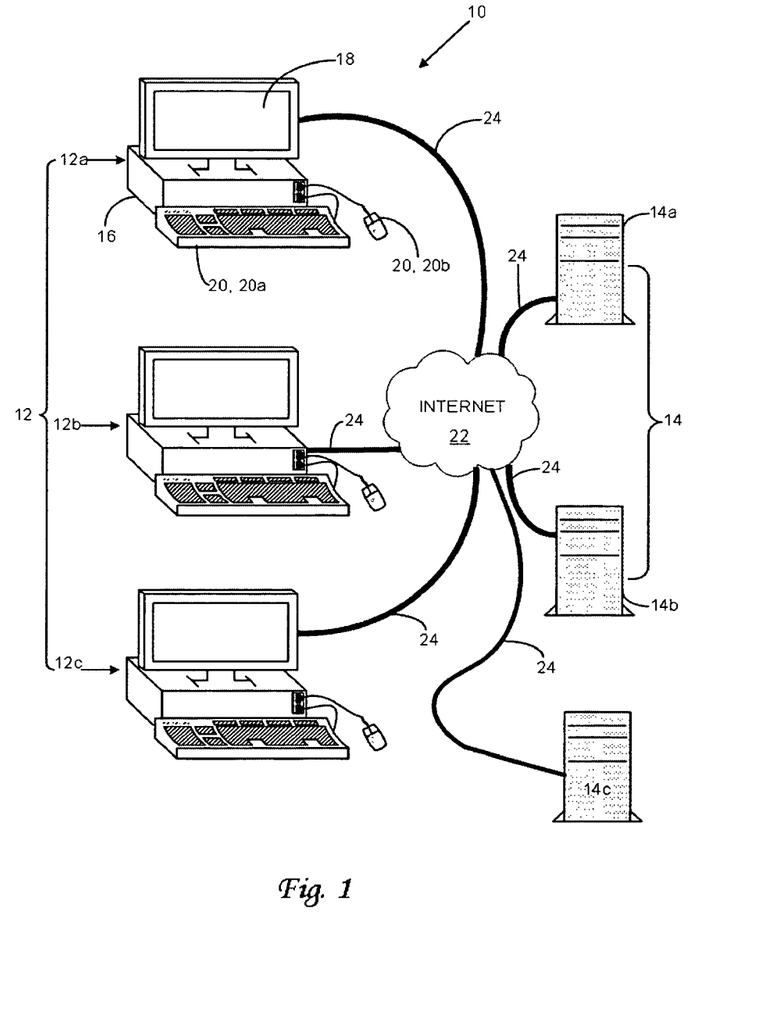
FIG. 1 is a block diagram illustrating an environment in which one aspect of the present invention may be implemented, including various interconnected servers, clients and networks.

With reference to FIG. 1, an exemplary computer network 10 includes various data processing apparatuses or computers 12, 14. More particularly, the computers 12 may be personal computers or workstations that function as client devices, and include a system unit 16 that houses a central processing unit, storage devices, and the like. The computers 12 may also include a display unit 18, and input devices 20 such as a keyboard 20a and a mouse 20b. It is understood that the system unit 16 receives various inputs from the input devices 20 that alter the control and flow of preprogrammed instructions being executed by the central processing unit, and the results of such execution are shown on the display unit 18. In one embodiment of the present invention the client computers 12 also referred to as client devices 12 may include for example a mobile phone or portable electronic device. The computers 14 may be servers that provide data or services to the client computers 12. In this regard, the term "client" is understood to refer to the role of the computers 12 as a requestor of data or services, while the term "server" is understood to refer to the role of the servers 14 to provide such data or services. Additionally, it is possible that the computers 12 may request data or services in one transaction and provide data or services in a different transaction, thus changing its role from client to server or vice versa. It is further understood that the term "server" as utilized herein may also refer generally to networked services such as a Secure Sockets Layer/Transport Layer Security (SSL/TLS) Virtual Private Network (VPN), through which conventional servers 14 provide data and applications to remote clients.

The computers 12, 14 are connected to a wide area network such as the Internet 22 via network connections 24. Requests from the client computers 12 and requested data from the server computers 14 are delivered through the network connections 24. According to an embodiment of the present invention, the server computers 14 are web servers, and the client computers 12 include web browsing applications such as Microsoft Internet Explorer that visually renders documents provided by the server computers 14 on the display unit 18. It will be appreciated that the network topology shown in FIG. 1 is presented by way of example only and not of limitation, and any other type of local or wide area network may be readily substituted without departing from the scope of the present invention. It is understood that any well known data transmission protocol may be utilized for the network connections 24 and the Internet 22.

Figure 2:
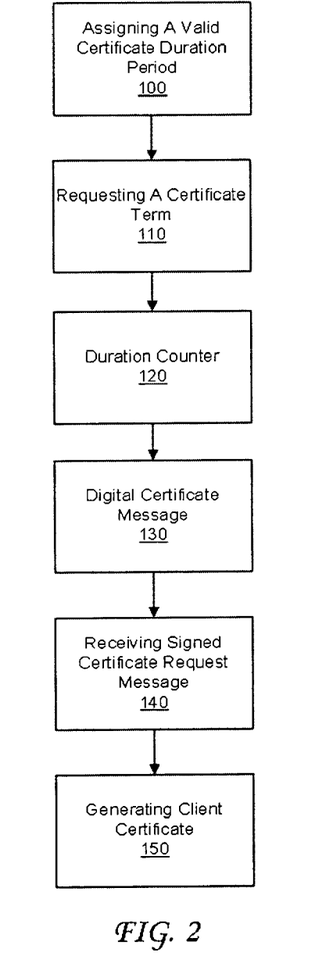
FIG. 2 is a flowchart illustrating a method for configuring a valid duration period for a digital certificate in accordance with an aspect of the present invention.
Figure 3:
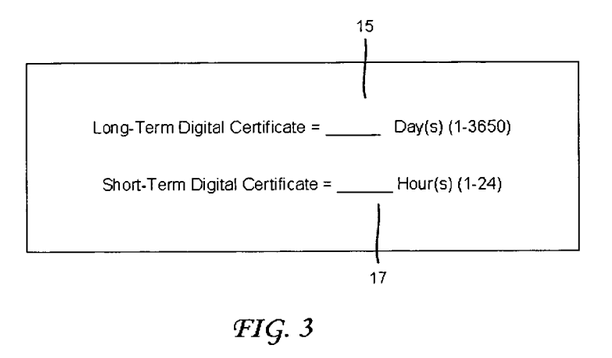
FIG. 3 is a screen shot illustrating the configuration parameters for assigning the positive numeric values associated with the certificate terms in accordance with an aspect of the present invention.
Figure 5:
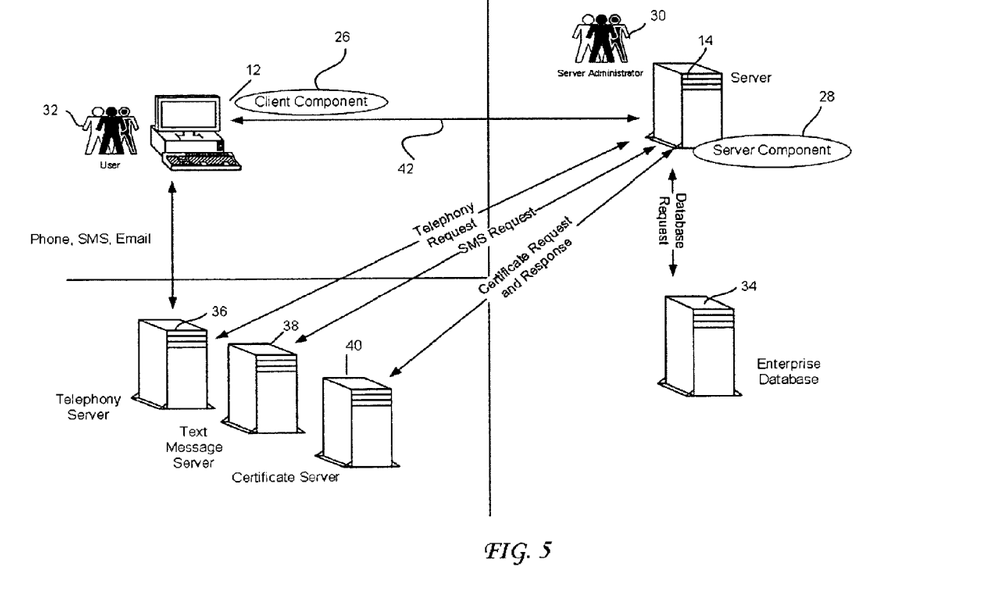
FIG. 5 is a first exemplary configuration for generating the digital certificate with the specified valid duration period in accordance with an aspect of the present invention including various subparts thereof.

With reference to the flowchart of FIG. 2, the diagram illustrates the various steps for configuring a valid duration period for a digital certificate. In particular, the first step disclosed in FIG. 2, contemplates assigning the valid duration period 100 a positive numeric value representative of the length in time the digital certificate is valid. For example, the positive numeric value may represent years, days, hours, minutes or any other contemplated unit of time until the digital certificate expires. Referring now to FIGS. 3 and 5, the step of assigning the valid duration period 100 the positive numeric value is explained in greater detail. An aspect of the present invention contemplates assigning the positive numeric value to the certificate term associated with a particular digital certificate. As shown in FIG. 3, the positive numeric value may be assigned to a long-term digital certificate via a configuration parameter 15. Accordingly, a different positive numeric value may be assigned to a short-term digital certificate via a configuration parameter 17. It is also contemplated that there may exist other digital certificate terms not categorized as short or long term and that each term may include a configuration parameter for which the positive numeric value may be assigned. As an example, the short-term digital certificate may be assigned any positive numeric value between 1 and 24. In this example, the positive numeric value is representative of hour(s). Therefore, if the positive numeric value between 1 and 24 is assigned the value of 10, then the valid duration period is 10 hours. Similarly, the long-term digital certificate may be assigned any positive numeric value between 1 and 3650. In this case, the positive numeric value is representative of day(s).

The server 14 as shown in FIG. 5, may deploy software capable of assigning the positive numeric value to either the long-term or the short-term digital certificate. As a result, both the long-term and the short-term digital certificate may include the valid duration period that corresponds to the positive numeric value assigned to each certificate term. In one embodiment of the present invention, the server 14 is a web server, an on-line enterprise or a hosting service. The server 14 includes a server component 28. The server component may reside on the server 14. A server administrator 30 having proper security clearance to the server 14 may assign the positive numeric value to both the long-term and the short-term digital certificate via the server component 28. The server component 28 is configured to allow the server administrator 30 to set either the long-term or the short-term of the certificate via the configuration parameters 15, 17 as shown in FIG. 3. An aspect of the present invention contemplates the configuration parameters 15, 17 being accessible to the server administrator via a graphic user interface (GUI) web console. It is also contemplated that a simple text change in a configuration file for the server component 28 may allow the server administrator 30 to assign the positive numeric value to each configuration parameter 15, 17. The server administrator 30 may choose any positive numeric value between 1 and 3650 to assign to the long-term digital certificate. Similarly, the server administrator 30 may choose any positive numeric value between 1 and 24 to assign to the short-term digital certificate. An aspect of the invention also contemplates the server administrator 30 changing the assigned positive numeric value specified for either the long-term or the short-term digital certificate via the configuration parameters 15, 17 in the same manner in which the positive numeric values were assigned to the particular certificate term initially. In this embodiment, the valid duration period for the digital certificate is ultimately determined by the server administrator. However, it is contemplated that the valid duration period may be assigned by a user of the client computer, input from a server administrator and/or input from a client or a server processor setting.

In yet another embodiment of the present invention, the server component 28 is a web plug-in. It is contemplated that the server component 28 is a plug-in software component installed on the server 14. Another aspect of the present invention contemplates the server component 28 being downloadable onto the server 14 via the network connection 24. The server component 28 may also include a stand alone device interfacing with the server 14.

Referring again to FIGS. 2 and 5, following the flowchart, the next step contemplates requesting the certificate term 110. Requesting the certificate term 110, contemplates a user 32 on the client device 12 selecting either the long-term or the short-term digital certificate. The client device 12 includes a client component 26. The client component 26 is configurable to be processed by the client device 12. The client component 26 is configured to prompt the user 32 of the client device 12 to request the certificate term. It is contemplated that the client component 26 prompts the user 32 in response to establishing a communication link 42 with the server component 28. The prompt for requesting the particular certificate term may be viewed by the user 32 on the display 18 of the client device 12. The communication link 42 established between the client component 26 and the server component 28 may be accomplished via a web browser application. The client component 26 may display the request for the certificate term on the web browser application. The client component 26 may include software to be installed on the client device 12 as a plug-in component. In another embodiment of the present invention, the client component 26 is downloaded via the Internet 22 from the server component 28. Therefore, it is contemplated that the server component 28 is in communication with the client device 12. In particular, the server component 28 may be in communication with the web browser application on the client device 12. According to one embodiment, the client component 26 is an Active-X component that is installed with a single user interaction via the web browser application. However, alternative executable components that may be added on to the browser application are also deemed to be within the scope of the present invention. These alternative executable components may include a .NET Smart Client on a Microsoft device, a Mozilla Firefox extension on any platform, flash software compatible with any platform, java software compatible with any platform or an Apple software module by way of example and not of limitation.

In accordance with an embodiment of the present invention, the user 32 of the client device 12 may request either the long-term certificate or the short-term certificate. The requested certificate term may be selected by the user 32 via a mouse or keyboard in communication with the client device 12. There are multitudes of ways in which the certificate terms may be prompted and selected by the user 32 of the client device 12. One example contemplates prompting a question for the user 32 to respond to on the web browser application. Based on the answer given by the user 32, the particular certificate term is requested. The question may ask the user 32 if the client device will be used again by the user 32. If the user 32 responds affirmatively, the long-term digital certificate is requested. If the user 32 responds negatively, the short-term digital certificate is requested. If the user 32 chooses not to respond, a default certificate term may be requested. It is contemplated that either the long-term or the short-term certificate may be set as the default certificate term requested. After the user 32 responds and a particular certificate term is requested, this request is transmitted to the server component 28. An aspect of the present invention, contemplates transmitting the requested certificate term via the established communication link 42 by way of the browser application. In another embodiment of the present invention, the requested certificate term is not transmitted to the sever component 28 prior to establishing a secure data transfer link. Additionally, the client component 26 may be downloaded onto the client device 26 in response to establishing the secure data transfer link.

In accordance with the present invention, the requested certificate term is transmitted to the server component 28 in the form of a certificate request 44. One aspect of the present invention contemplates that the certificate request 44 is a Public Key Cryptography Standard (PKCS) #10. A certificate request 44 consists of three parts: certification request information, a signature algorithm identifier, and a digital signature on the certification request information. The certification request information consists of the entity's name, the entity's public key, and a set of attributes providing other information about the entity. The process by which a certification request is constructed involves the following steps: (1) a CertificationRequestInfo value containing a subject name, a subject public key, and optionally a set of attributes is constructed by an entity requesting certification. (2) The CertificationRequestInfo value is signed with the subject entity's private key. (3) The CertificationRequestInfo value, a signature algorithm identifier, and the entity's signature are collected together into a CertificationRequest value. A certification authority (CA) fulfills the request by authenticating the requesting entity and verifying the entity's signature, and, if the request is valid, constructing an X.509 certificate from the name and public key, the issuer name, and the CA's choice of serial number, the valid duration period as specified by the server component 28 and the client device 12, and signature algorithm.

In accordance with an embodiment of the present invention, the certificate request 44 may not be transmitted to the server component 28 prior to establishing the secure data transfer link between the client device 12 or the client component 26 and the server component 28. The secure data transfer link may be established between the client device 12 and the server 14 by registering the client device 12 with the server 14 and successfully completing a multi-factor authentication process to ensure that the client device 12 is not an impostor or hacker to secure all communications between the client device 12 and the server 14 or server component 28. The user 32 may initiate the registration and authentication process by establishing an unsecured connection with the server 14. For example, the user 32 may input the network address of the server computer 14 into the browser application on the client device 12, at which point a request is made for a file or page on the server computer 14. In response, the server 14 may request information to determine if the user 32 of the client device 12 is authorized to access the server 14. The information requested for example may include a username or a password. The browser application on the client device 12 then requires the user 32 to input the username and/or password to gain access to the server 14. The server 14 then determines if the information provided by the user 32 of the client device 12 is correct. The server 14 via the server component 28 may be in communication with an enterprise database 34 which may function as a back-end data store. The database 34 may include the user's 32 username and password to determine if the user 32 provided the correct information. In one embodiment of the present invention, the database 34 is located within the server 14. In another embodiment, the database 34 is a remote server in communication with the server component 28 via the network connection 24 or the Internet 22. The server 14 may be an Active Directory server, a Lightweight Directory Access Protocol (LDAP) server, a database server, and so forth.

Prior to successfully authenticating the client computer 12, the user 32 associated therewith can be authenticated via an out-of-band modality. According to one embodiment, the server component 28 notifies a telephony server 36 to deliver a one-time password to a mobile phone or a landline phone under the control of the user 32. Alternatively, an e-mail or a Short Message Service (SMS) text message may be sent from a text message server 38. Other out-of-band authentication techniques are contemplated, such as voice recognition, IP address verification, and the like. The entry of the one-time password may be handled through the server 14 with the server component 28. In lieu of, or in addition to the foregoing out-of-band authentication, the user 32 may be presented with an additional knowledge-based authentication scheme. For example, the user 32 may be asked about their favorite color, their mother's maiden name, and other similar questions. Additional authentication information may be stored in the database 34 for later retrieval and use by the server component 28. It is understood that the foregoing procedure "registers" the client web browser on the client device 12 with the server computer 14, effectively making such browser a second authentication factor ("Something the user has"). As indicated above, the one-time-password is delivered over a communications modality that is independent of, or out-of-band with respect to, the data communication link between the client device 12 and the server 14. The telephony sever 36 may be managed by a third party, or by the organization that manages the server 14 or the database 34. The server component 28 directs the user 32 on the client device 12 to enter an authoritative response. Along these lines, it is understood that the telephony server 36 and the step of transmitting the authoritative response to the client device 12 may be omitted, where the authoritative response is an answer to a knowledge-based question. This answer is contemplated as being predefined by the user 32 at an earlier time.

Figure 4:
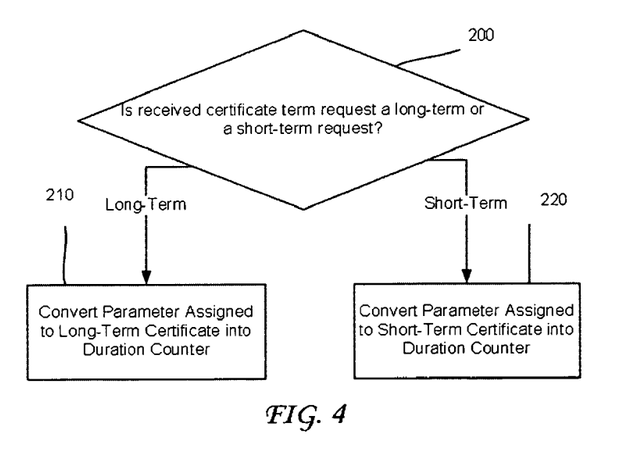
FIG. 4 is a flowchart illustrating the step prior to generating a duration counter in accordance with an aspect of the present invention.

Referring back to the flowchart of FIG. 2, following the user 32 requesting a certificate term 110, the next step may include generating a duration counter 120. The server component 28 receives the certificate request 44 from the client device 12. The server component 28 then process the certificate request 44 to determine whether the user 32 requested the long-term or the short-term digital certificate. Referring now to FIG. 4, the server component 28 upon processing the certificate request 44 determines if the received certificate request 44 requests the long term or the short term certificate according to step 200. In step 210, the server component 28 determined that the long-term certificate was requested. Therefore, the positive numeric value assigned by the server administrator 30 via the configuration parameter 15 is converted into the duration counter. If the server component 28 in step 200 determines that the certificate request 44 contains a request for the short-term certificate, then the positive numeric value associated with the short term certificate is converted into the duration counter as shown in step 220. Although the positive numeric value associated with either the long-term or the short term digital certificate is representative of the valid duration period, the value is not in the format of a computer understood time unit. As a result, the server component 14 after receiving the certificate request 44 converts the positive numeric value associated with the requested certificate term into the duration counter. The duration counter is a computer understood time unit. It is contemplated that the server component 28 accomplishes the conversion by processing a simple mathematical algorithm. In one embodiment of the present invention the algorithm may include a simple formula for converting between different time units.

An aspect of the present invention contemplates a computer understood time unit represented by a "clock tic" on a computer. A single clock tic on the computer may be represented by 100 nano-seconds. For example, if the user 32 of the client device 12 will not be using the client device 12 again, the certificate request 44 received by the server component 28 requests the short-term digital certificate. Once received on the server component 28, the server component 28 determines the positive numeric value associated with the short-term digital certificate. If the positive numeric value associated with the short-term digital certificate is 1, then the valid duration period of the short-term certificate is 1 hour. Thereafter, the 1 hour valid duration period is converted into the computer understood time unit such as clock tics. The server component 28 calculates the quantity of clock tics in 1 hour. The conversion is a simple unit conversion. For this example, 1 hour would equal 36 billion clock tics. It is also contemplated that the server component 28 has the ability to convert days, minutes, and years into clock tics. Additionally, any unit of time may be converted into clock tics by the server component 28. Therefore, the number of tics included in the duration counter is dependent upon the positive numeric value associated with the requested certificate term transmitted with the certificate request 44.

Figure 6:
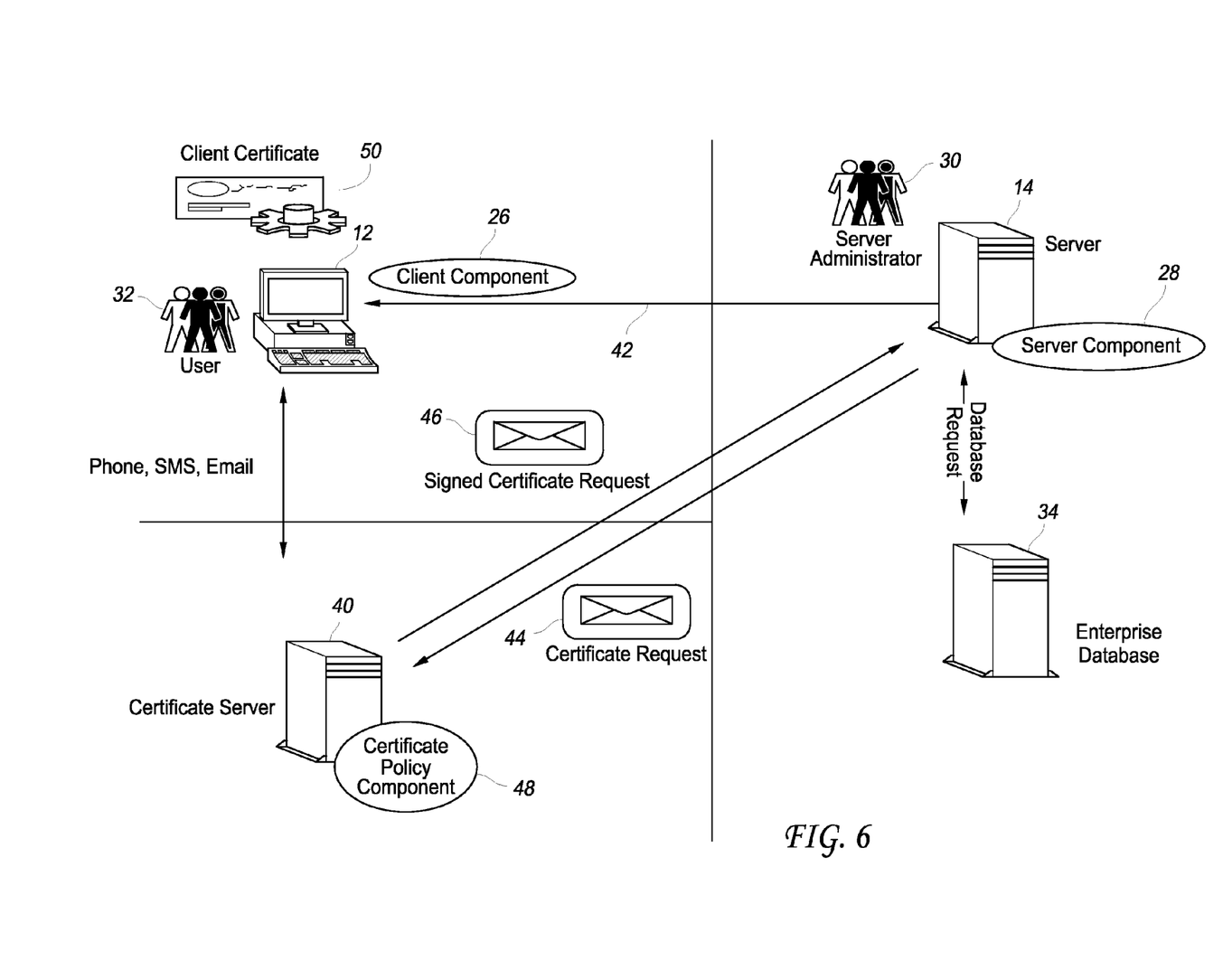
FIG. 6 is a second exemplary configuration for generating the digital certificate with the specified valid duration period in accordance with an aspect of the present invention including various subparts thereof.

Referring now to FIG. 6, following the conversion of the positive numeric value associated with the requested certificate term into the duration counter (clock tic count), the server component 28 transmits the certificate request 44 to a certificate server 40. The certificate request 44 may be in the form of a PKCS #10 request. An aspect of the present invention contemplates the PKCS #10 request being an X.509 certificate request 44. In one embodiment of the present invention, the certificate server 40 is a certificate authority. The certificate server 40 is configured to digitally sign the certificate request 44. In another embodiment of the present invention, the certificate server 40 is a server remote from the client device 12 and the server computer 14. In another embodiment of the present invention, it is contemplated that the certificate server 40 is disposed or built into the server computer 14.

In accordance with another embodiment of the present invention, the server component 28 communicates with the certificate server 40 via a secured WSE 3.0 WebService call. According to the embodiment shown in FIG. 6, the certificate server 40 is the CA, and is understood to be within the control of a legitimate third party provider separate from the organization managing the server computer 14 and the enterprise database 34. In an alternative configuration not shown, the certificate server 40, the text message server 38 and the telephony server 36 are managed and maintained by the same organization managing the server computer 14. In yet another configuration, secure access is being enabled for web services. As understood, the term web service refers to a standardized system for supporting machine to machine interaction. In this case, the client device 12 utilizes the client component 26 to authenticate with the server computer 14. The client certificate thus generated is utilized to authenticate a W3 client to authenticate with the web service via the client certificate.

Upon receiving the certificate request 44 at the certificate server 40, the next step may require generating a digital certificate message 130 as referenced in the flowchart of FIG. 2. The certificate server 40 as shown in FIG. 6 may include a certificate policy component 48. The certificate policy component 48 is integrated into the certificate server 40. The certificate policy component 48 is configured to generate the digital certificate message having the valid duration period correspond to the duration counter received on the certificate server 40 via the certificate request 44. The certificate policy component 48 residing on the certificate server 40 may be configured to convert the digital clock tics of the duration counter into a value representative of the valid duration period and assign it to the digital certificate message. In one embodiment of the present invention, it is contemplated that the certificate policy component 48 is a software plug-in to the certificate server 40. The certificate policy component 48 may be code written in a programming language compatible with the certificate server 40. In another embodiment, it is contemplated that the certificate policy component 48 is transmitted to the certificate server 40 for processing via the server computer 14. The certificate policy component 48 is configured to access the duration counter on the certificate server 40 prior to generating the digital certificate message. It is also contemplated that the certificate policy component 48 is programmed to configure the advanced cryptographic functions on the certificate sever 40 to generate the digital certificate message having the valid duration period correspond to the duration counter received. In other words, the certificate policy component 48 is coded to access the duration counter and to set the valid duration period according to the received duration counter. Therefore, the valid duration period may be set on the digital certificate message for the current date plus the period specified in the certificate request 44. The certificate that is generated as a result of the digital certificate message expires when the valid duration period is over. The digital certificate message generated at the certificate server 40 is transmitted in the form of a PKCS #7 response to the original PKCS #10 signing request requested by the server component 28 residing on the server 14. The PKCS #7 response according to one embodiment of the present invention may be an X.509 certificate request response. The certificate request response is a signed certificate request 46. Thus, after the certificate policy component 48 generates the digital certificate message having the valid duration period correspond to the duration counter, the message is transmitted to the server component 28 in the form of the signed certificate request 46.

Referring again to FIG. 2, following the generation of the digital certificate message 130, the next step proceeds with receiving the signed certificate request 140. The server component 28 is in communication with the certificate server 40 and configured to receive the signed certificate request 46. Upon receiving the signed certificate request 46, the server component 14 transmits the signed certificate request 46 to the client device 12. It is contemplated that the signed certificate request 46 is received on the client device 12 via the web browser application. In one embodiment of the present invention, the server component 28 transmits the signed certificate request 46 to the client component 12 via a PKCS #7 response to the client component 26 on the client device 12.

PKCS #7 is used to sign and/or encrypt messages under a PKI. It may also be used for certificate dissemination in response to a PKCS #10 message. For each signer, a message digest is computed on the content with a signer-specific message-digest algorithm. If the signer is authenticating any information other than the content, the message digest of the content and the other information are digested with the signer's message digest algorithm, and the result becomes the "message digest." For each signer, the message digest and associated information are encrypted with the signer's private key. For each signer, the encrypted message digest and other signer-specific information are collected into a SignerInfo value. Certificates and certificate-revocation lists for each signer, and those not corresponding to any signer, are collected in this step. The message-digest algorithms for all the signers and the SignerInfo values for all the signers are collected together with the content into a SignedData value. A recipient verifies the signatures by decrypting the encrypted message digest for each signer with the signer's public key, then comparing the recovered message digest to an independently computed message digest. The signer's public key is either contained in a certificate included in the signer information, or is referenced by an issuer name and an issuer-specific serial number that uniquely identify the certificate for the public key.

Referring back to the flowchart of FIG. 2, the method concludes with the client component 26 generating a client certificate 150. The client component 26 receives the PKCS #7 signed certificate request 46 that was signed by the certificate server 40 and transmitted to the server component 28. The client component 26 generates the corresponding client certificate and public and private key pair. The valid duration period of the client certificate corresponds to the "clock tics" calculated by the server component 28. The method provides generating a client certificate wherein the valid duration period is dependent upon the positive numeric value entered into the configuration parameters 15, 17 on the server component 28 by the server administrator 30. The method contemplates the server administrator 30 assigning the valid duration period for the long-term and the short-term digital certificate and the user 32 of the client device 12 requesting either the long-term or the short-term digital certificate. It is also contemplated that the client component 26 could automatically determine if the certificate is short or long term through internal processing or use of a third party decision input. The enforcement of the valid duration period is handled by the client device 12 and the device receiving the client certificate. It is contemplated that the enforcement of the valid duration period is handled by the web browser application on the client device 12. The device receiving the client certificate may include the web server 14, a virtual private network, a firewall, an e-mail system, or any device capable of utilizing a certificate for client SSL authentication.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. A method for configuring a valid duration period for a digital certificate having a certificate term, the method comprising:
    assigning a numeric value for each certificate term of a plurality of certificate terms, the numeric value being representative of the valid duration period;
    identifying a certificate term of the plurality of certificate terms;
    converting the numeric value associated with the identified certificate term into a duration counter value according to a local policy defined on a server separately from the identified certificate term;
    transmitting a certificate request, including the duration counter value, to a certificate server configured to sign the certificate request in response to receipt thereof;
    receiving from the certificate server a signed certificate request; and
    transmitting the signed certificate request to a client device capable of generating the digital certificate, the digital certificate having the valid duration period corresponding to the numeric value converted from the identified certificate term being generated on the client device based upon the signed certificate request,
    said method performed by a computing system that comprises one or more computing devices.

2. The method of claim 1, wherein identifying the certificate term comprises the server selecting the certificate term by default.

3. The method of claim 1, further comprising:
    transmitting, to the client device, data configured to request a user to select the certificate term from the plurality of certificate terms; and
    receiving an indication of the certificate term on a server via a certificate request.

4. The method of claim 3, wherein the plurality of certificate terms include a long-term certificate and a short-term certificate.

5. The method of claim 3, wherein the data configured to request a user to select the certificate term from the plurality of certificate terms is one of: an Active-X component or a .Net component.

6. The method of claim 3, wherein the duration counter value is a computer understood time unit.

7. The method of claim 3, wherein the server is accessible by a server administrator for assigning the numeric value associated with each certificate term of the plurality of certificate terms.

8. The method of claim 6, wherein the signed certificate request comprises a digital signature representing authenticity of the valid duration period corresponding to the duration counter value.

9. Non-transitory computer storage that comprises executable instructions that direct a computing system to at least:
    assign a numeric value for each certificate term of a plurality of certificate terms, the numeric value being representative of the valid duration period;
    transmit, to a client device, data configured to request a user to identify a certificate term from the plurality of certificate terms;
    receive an indication of the identified certificate term via a certificate request,
    convert the numeric value associated with the identified certificate term into a duration counter value according to a local policy defined on a server separately from the identified certificate term;
    transmit the certificate request including the duration counter value, to a certificate server configured to sign the certificate request in response to receipt thereof;
    receive from the certificate server a signed certificate request wherein the signed certificate request comprises a digital signature representing authenticity of the valid duration period corresponding to the duration counter value; and
    transmit the signed certificate request to a client device capable of generating a digital certificate, the digital certificate having the valid duration period corresponding to the numeric value converted from the identified certificate term being generated on the client device based upon the signed certificate request.

10. The non-transitory computer storage of claim 9, wherein the duration counter value is a computer understood time unit.

11. The non-transitory computer storage of claim 9, wherein the plurality of certificate terms include a long-term certificate and a short-term certificate.

12. The non-transitory computer storage of claim 9, wherein the data configured to request the user to identify the certificate term from the plurality of certificate terms is based upon automated parameters existing on the client device.

13. A system for configuring a valid duration period for a digital certificate, the system comprising:
a computing system comprising one or more computing devices, said computing system programmed via executable instruction to at least:
assign a numeric value for each certificate term of a plurality of certificate terms, the numeric value being representative of the valid duration period;
transmit component data, to a client device, configured to prompt a user to select a certificate term from the plurality of certificate terms;
receive, from the client device, an indication of a selected certificate term of the plurality of certificate terms;
convert the numeric value associated with the selected certificate term into a duration counter value according to a local policy defined on a server separately from the selected certificate term;
transmit a certificate request including the duration counter value, to a certificate server configured to sign the certificate request in response to receipt thereof;
receive from the certificate server a signed certificate request; and
transmit the signed certificate request to a client device capable of generating a digital certificate, the digital certificate having the valid duration period corresponding to the numeric value converted from the selected certificate term being generated on the client device based upon the signed certificate request.

14. The system of claim 13, wherein the numeric value assigned to each certificate term is variable.

15. The system of claim 13, wherein the plurality of certificate terms include a long-term certificate and a short-term certificate.

16. The system of claim 13, wherein the component data configured to prompt a user to select the certificate term from the plurality of certificate terms is one of: an Active-X component or a .Net component.

17. The system of claim 13, wherein the duration counter value is a computer understood time unit.

18. The system of claim 13, wherein the server is accessible by a server administrator for assigning the numeric value associated with each certificate term of the plurality of certificate terms.

19. The system of claim 13, wherein the signed certificate request comprises a digital signature representing authenticity of the valid duration period corresponding to the duration counter value.

20. The system of claim 13, wherein the computing system is further programmed via executable instruction to at least, prior to transmitting component data, determine if the user of the client device is authorized to access the server.

* * * * *

UNITED STATES PATENT AND TRADEMARK OFFICE
CERTIFICATE OF CORRECTION

PATENT NO. : 8,468,340 B2  Page 1 of 1
APPLICATION NO. : 13/663304
DATED : June 18, 2013
INVENTOR(S) : Grajek et al.

It is certified that error appears in the above-identified patent and that said Letters Patent is hereby corrected as shown below:

Title Page (item 72, Inventors) at line 2, Change "Garret Graiek" to --Garret Grajek--.

In column 2 (Title page 2, item 56, Other Publications) at line 7, Under Other Publications, change "is PKI?" to --is a PKI?--.

Signed and Sealed this
Twelfth Day of November, 2013

Teresa Stanek Rea
*Deputy Director of the United States Patent and Trademark Office*